June 24, 1958

A. J. SKILES 2,840,143

TIRE BEAD BREAKING PRESS ASSEMBLY

Filed Jan. 10, 1956

INVENTOR.
A. J. SKILES

BY Wade Koontz
Paul M Palmer
ATTORNEYS

June 24, 1958 A. J. SKILES 2,840,143
TIRE BEAD BREAKING PRESS ASSEMBLY
Filed Jan. 10, 1956 6 Sheets-Sheet 5

INVENTOR.
A. J. SKILES
BY
ATTORNEYS

June 24, 1958  A. J. SKILES  2,840,143
TIRE BEAD BREAKING PRESS ASSEMBLY
Filed Jan. 10, 1956  6 Sheets-Sheet 6

INVENTOR.
A. J. SKILES
BY
ATTORNEYS

United States Patent Office 2,840,143
Patented June 24, 1958

2,840,143

TIRE BEAD BREAKING PRESS ASSEMBLY

A. J. Skiles, South San Antonio, Tex.

Application January 10, 1956, Serial No. 558,389

5 Claims. (Cl. 157—1.26)

(Granted under Title 35, U. S. Code (1952), sec. 266)

The invention described herein may be manufactured and used by or for the United States Government for governmental purposes without payment to me of any royalty thereon.

This invention relates to a pneumatic tire bead breaking machine and more particularly to a machine in the form of a press for separating or breaking the beads of large size tires, such as are employed on aircraft or the like, free from the wheel rims on which the tires are mounted.

In dismounting tire casings of large size from the wheels, especially tires of the type employed on aircraft landing gear or the like, great difficulty has been experienced in handling such tires which are very heavy and cumbersome.

This difficulty is particularly experienced when attempting to free the beads of the tire casing from the wheel rim as for a change of the tire when worn or damaged, replacing a defective inner tube, or for purposes of inspection frequently required at commercial airports and military air fields.

Manually removing a tire casing from its wheel is, of course, impracticable, for such an operation on large size tires usually requires hours of manual effort, and the constant hammering of the tire frequently has injurious effects on the tire.

Also, the various mechanically operated tire changing devices, presently employed, have proven unsatisfactory for they frequently cause injury to the inner tubes and to the valves thereof during the changing or operation.

It is therefore the purpose of the present invention to provide a new and improved tire bead breaking device wherein the separating of the beads of the tire casing from the wheel rim in order for the tire casing to be dismounted is effectively performed in a short time, with the slightest effort on the part of the operator and without any injury to the tire, and wherein tire casings of various sizes, for instance of 33" to 65", may efficiently be used without necessitating additional equipment. Furthermore, in the tire bead breaking device in accordance with the present invention, the beads of the tire casing may be separated or broken from the rim independently on either side of the wheel, or they may be broken on both sides of the wheel simultaneously.

According to the present invention, a device for separating or breaking the beads of an aircraft tire casing free from the wheel rim on which the tire casing is mounted, comprises a set of hydraulically operated plungers provided with breaking means, and which plungers are arranged opposite each other and are capable of independent operation so as to engage the respective sides of the tire casing to push the beads free of the wheel rim, while the wheel on which the tire casing is mounted is held in an erect position by another set of hydraulic plungers provided with wheel aligning means that act as a vise-like member during the bead breaking operation. Also, both sets of the hydraulic plungers are adapted to be raised or lowered to accommodate tire wheels of different diametrical sizes.

These and other features of the present invention are described in detail below in connection with the accompanying drawings, in which.

Figure 1:
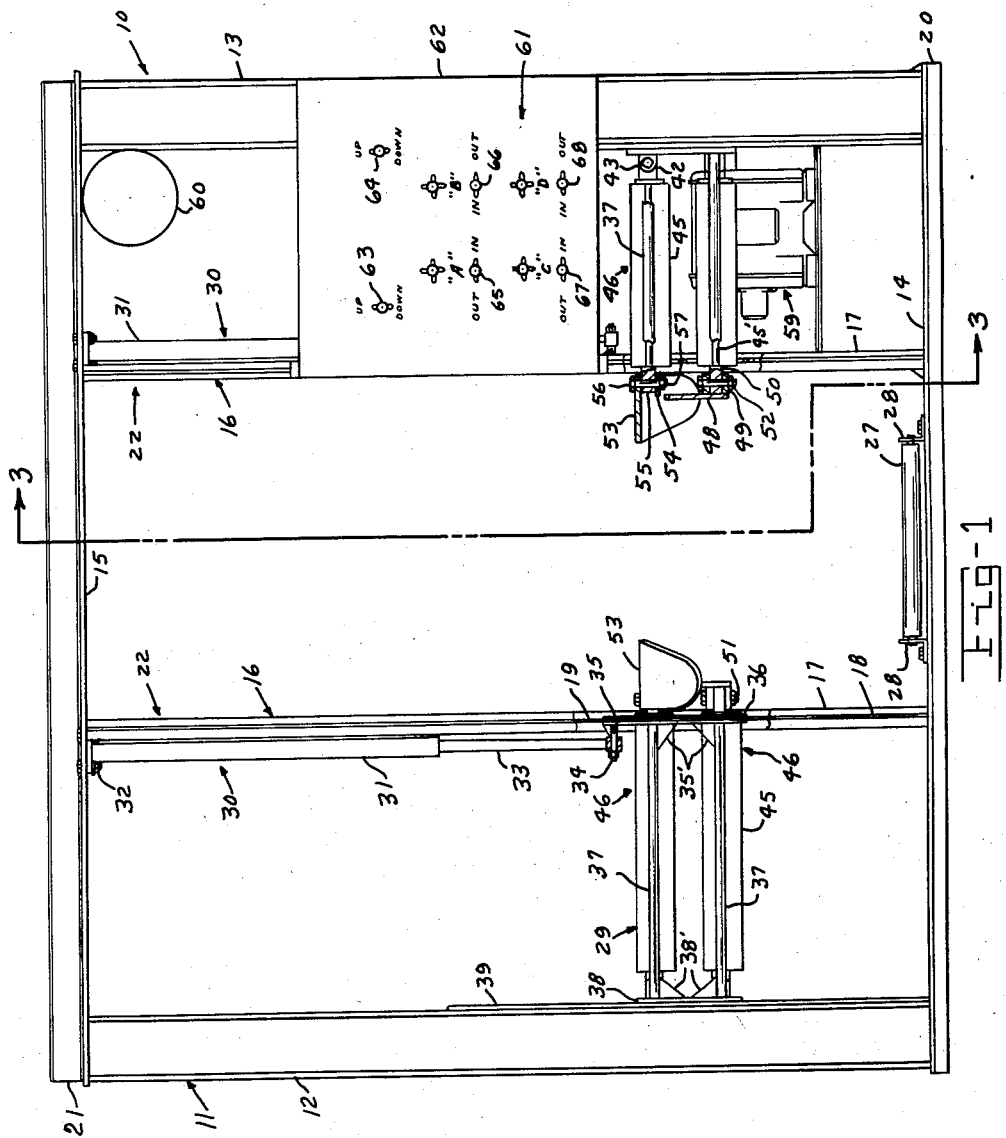
Fig. 1 is a front elevation of a tire bead breaking press assembly embodying the present invention, with certain of the parts shown in section.
Figure 5:
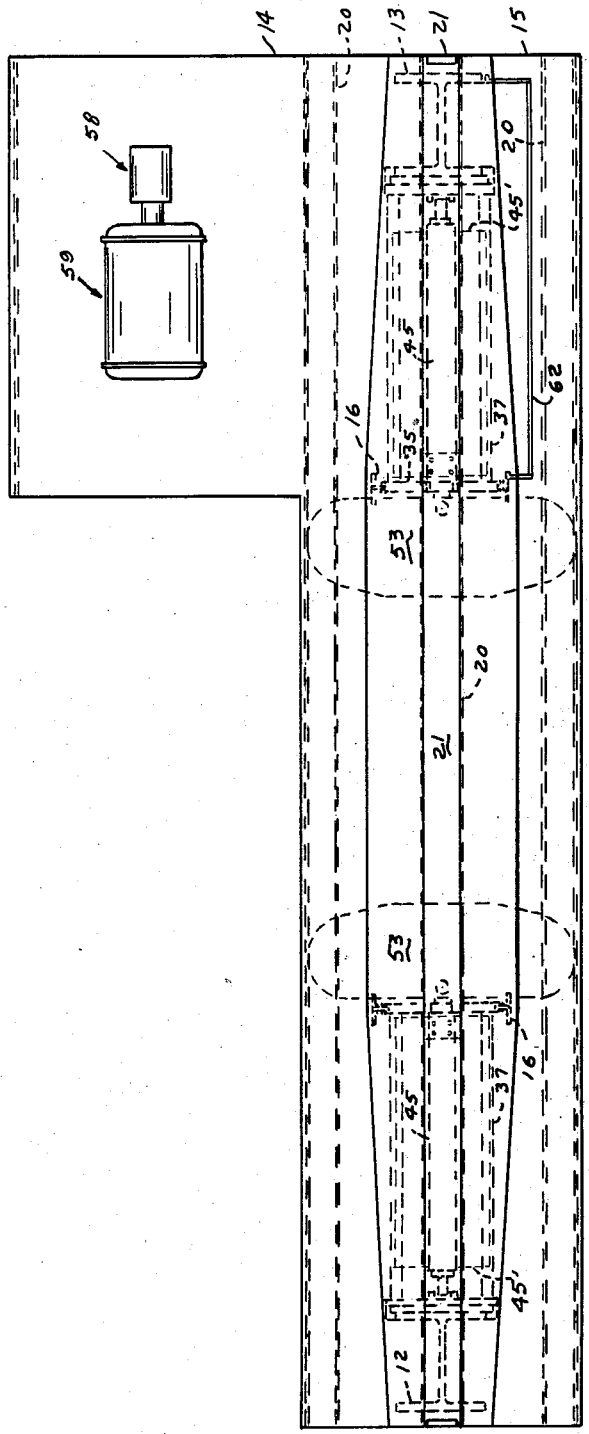
Fig. 5 is a top plan view of the device shown in Fig. 1.

Referring now in detail to the drawings, wherein like numerals designate like parts throughout the several views, the embodiment of the tire bead breaking press of the present invention illustrated in Fig. 1 is indicated generally by the reference numeral 10 and, as shown, comprises an upright frame assembly 11 consisting of I-beam standards 12 and 13 with their open sides facing laterally outwardly, lower and upper horizontal cross plates 14 and 15, welded to the standards 12 and 13 at the lower and upper ends of the standards, and intermediate standards 16 mounted in longitudinally and transversely spaced relation, as shown in Figs. 1 and 5, and likewise welded to the lower and upper plates 14 and 15 at the lower and upper ends thereof.

Each of the intermediate standards 16 consists of a pair of L-shaped beams indicated at 17, with a plate 18 bolted in between so as to form a track 19 extending vertically and inwardly for a purpose as hereinafter described.

Figure 2:
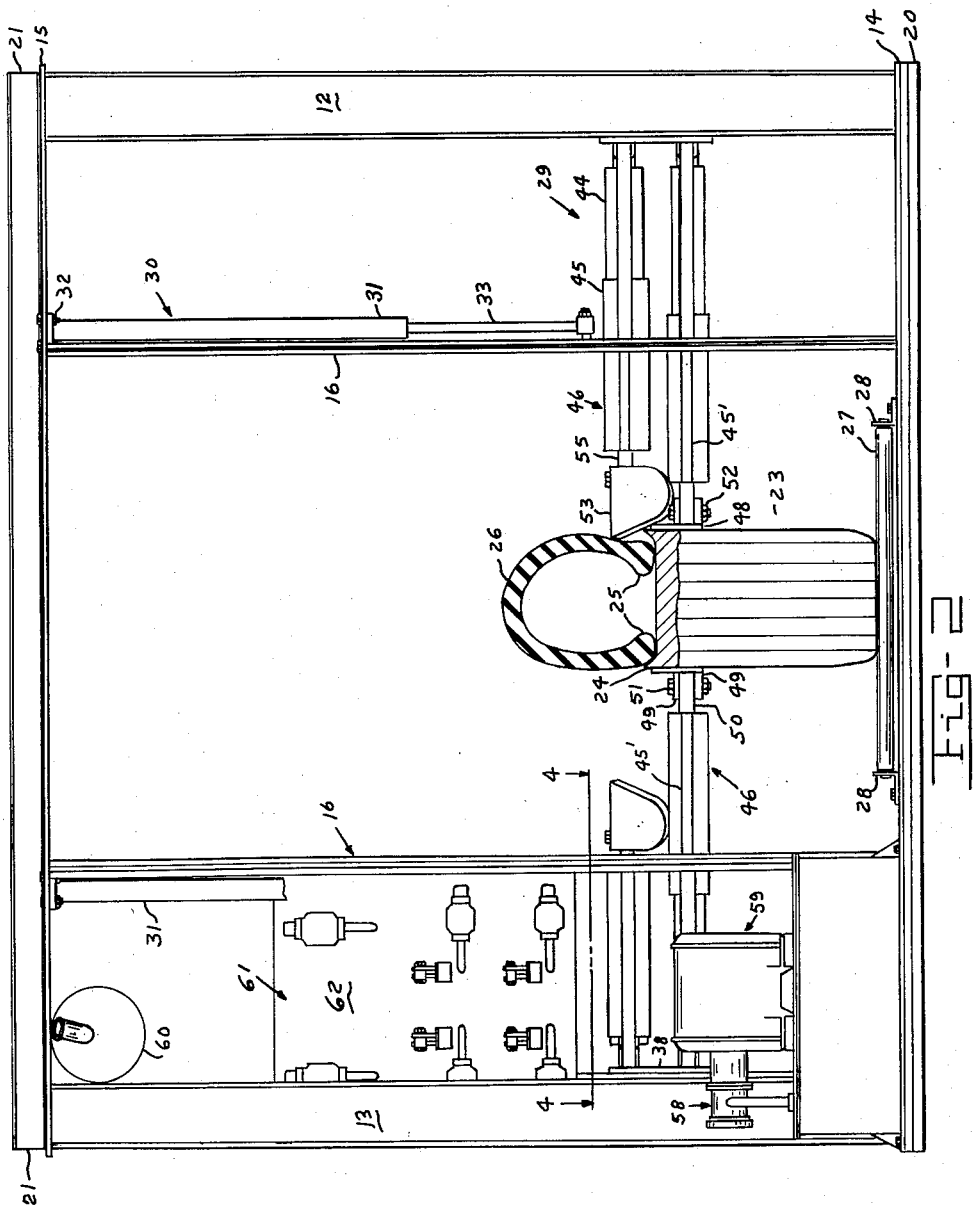
Fig. 2 is a rear elevation of the device shown in Fig. 1, in operative relation to a wheel and tire assembly.
Figure 3:
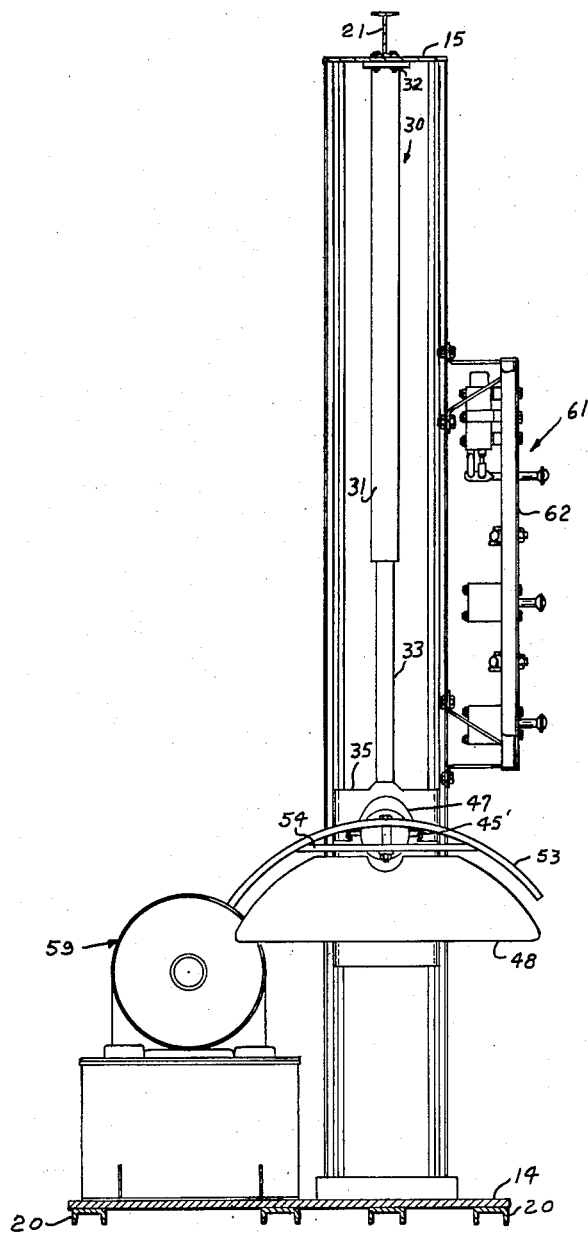
Fig. 3 is a vertical section taken approximately along the line 3—3 of Fig. 1.

The upright frame assembly 11 may be, further, supported off the ground on longitudinally extending channel beam members 20, and, also, it may be provided with a longitudinally horizontally extending I-beam member 21, welded to the upper cross plate 15, for supporting the tire bead breaking apparatus as shown in Figs. 1 to 3.

The I-beam standards 12 and 13 with the intermediate standards 16 are arranged on the lower cross plate 14 so as to form a pair of frame sections 22 in horizontally spaced relation, the space provided between the frame sections 22 being utilized for positioning of wheel 23 having a rim 24 on which the beads 25 of a tire casing 26 are seated. The wheel 22 may be positioned on conveyor rollers 27 swivelly mounted on brackets 28 attached to the lower cross plate 14 and adapted to support the tire wheel 23 thereon.

Each of the frame sections 22 is further arranged to support an elevator frame 29 slidably mounted thereon for vertical adjustment in order to accommodate tire wheels of different diametrical sizes.

The vertical adjustment of each elevator frame 29 is effected by the use of a vertical extending hydraulically operated jack 30 having a cylinder 31 fixedly attached at one end thereof to the underside of the upper cross plate 15 and to the I-beam member 21 by bolts 32. Projecting downwardly from the cylinder 31, a piston rod 33 is connected at the free end thereof to a bolt 34 extending rearwardly from a front vertical plate 35 of the elevator frame 29, whereby actuation of the hydraulic jacks 30 will cause the elevator frames 29 to be simultaneously or independently raised or lowered as the case may be.

Figure 4:
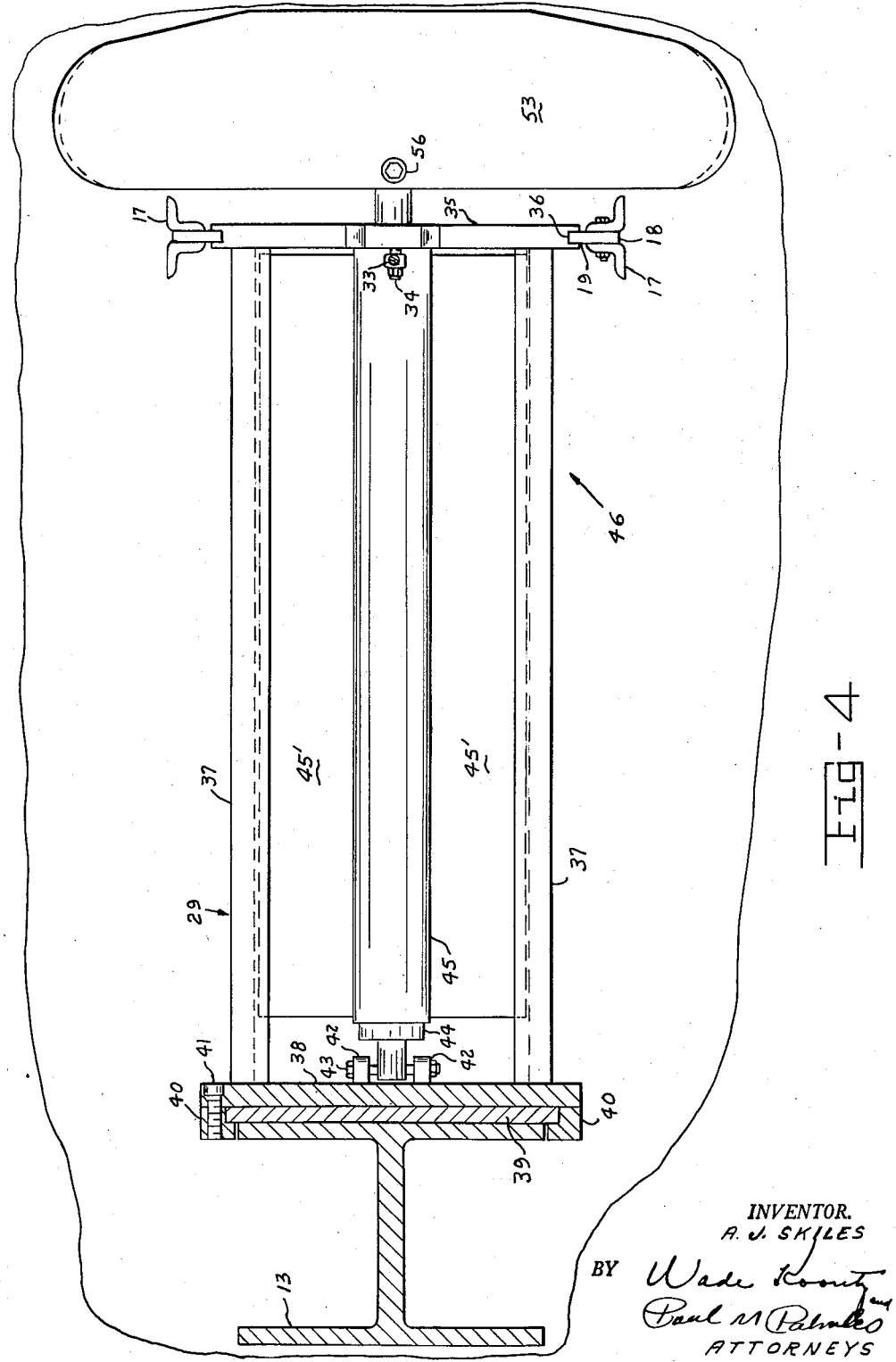
Fig. 4 is a transverse horizontal section taken approximately along the line 4—4 on Fig. 2.

The front vertical plate 35 of each elevator frame 29 is also arranged to slidably engage the adjacent tracks 19 on the intermediate standards 16 as by a groove 36 formed on each vertical side edge of the plate 35, as shown in Figs. 1 and 4. Extending rearwardly from the front vertical plate 35 of each elevator frame 29 are horizontal channel members 37 with their open side facing laterally inwardly, and which channel members 37 are attached, as by welding, to a rear vertical plate 38 adapted to slidably engage a vertically disposed stationary plate 39 attached to the inner side of the standard 12 or 13. The channel members 37 may be further secured to the front and rear vertical plates 35 and 38 by gusset plates 35' and 38', respectively, thus increasing the firmness of the elevator frame structure.

The vertically disposed stationary plate 39 being of greater width than the I-beam standard 12 or 13 has vertical side edge portions extending beyond the edges of the flanges of the I-beam standard 12 or 13. These side edge portions serve as tracks engaged by angle members 40 attached by screws 41 to the rear vertical plate 38 of each elevator frame 29. In this manner, each elevator frame 29 is slidaly supported by the standard 12 or 13 at the rear end of the elevator frame 29 and by the intermediate standards 16 at the front end of the elevator frame 29 for vertical adjustment by actuation of the hydraulic jacks 30.

Supportably pivoted on lugs 42 on the inner side of the rear vertical plate 38 of each elevator frame 29 by a pin 43 is a piston rod 44 of each horizontally disposed cylinder 45 of a pair of hydraulic plungers 46 disposed in vertically spaced relation. Each cylinder 45 being provided with ribs 45' horizontally projecting from the sides of the cylinder 45 which are adapted to engage the horizontal channel members 37 on either side of the cylinder 45, whereby the channel members 37 serve as tracks for slidably supporting each cylinder 45 of the plungers 46.

The cylinders 45 of the plungers 46 are further arranged to project through openings 47 in the front vertical plate 35 of each elevator frame 29 and toward each other in the space between the frame sections 22, in which space the wheel 23 with the tire casing 26 is positioned so as to be engaged by the cylinders 45 on the opposite sides thereof.

Attached to each lower cylinder 45 of the oppositely facing plungers 46 of the elevator frames 29 is a vertically disposed aligning plate element 48, having horizontally disposed plates 49 between which a stud 50 fixed to the front end of the cylinder 45 projects and is held therewith by a bolt 51 extending through the plates 49 and the stud 50, the free end of the bolt 51 having a nut 52 screwed thereon. The aligning plate elements 48 being of substantially semi-circular shape are adapted to engage the opposite sides of the wheel 23 when the cylinders 45 are in projected position and thereby act as vise-like for aligning and holding the wheel 23 in erect position.

The cylinders 45 of the upper oppositely facing plungers 46 of the elevator frames 29 are each likewise provided with an arcuate breaking plate element 53, with its concave side facing downwardly, and having a horizontally disposed plate 54 for positioning under a stud 55 fixed to the front end of the upper cylinder 45, and connected thereto by a bolt 56 extending vertically through the arcuate plate 53, its horizontal plate 54 and the stud 55, which bolt 56 is retained thereon by a nut 57 screwed on the free end thereof.

By this arrangement, the breaking elements 53 are adapted to engage the opposite side walls of the tire casing 26, either independently or simultaneously, when either or both cylinders 45 of the upper plungers 46 are projected toward each other in the space provided between the frame sections 22 where the wheel 23 is positioned, whereby the breaking elements 53 may push either or both beads 25 of the tire casing 26 free from their respective rims 24 of the wheel 23 as shown in Fig. 2.

Actuation of the hydraulic plungers 46 and the hydraulic jacks 30 is effected by a hydraulic system provided with a pump 58 operatively connected to a motor 59, and a fluid reservoir 60 hydraulically connected to the pump 58 and to the cylinders 30, 45 as by piping not shown. Hydraulic fluid under pressure is then directed by the pump 58 from the reservoir 60 to the various hydraulic cylinders through a system of pressure control valves generally indicated at 61 on panel 62 as shown in Figs. 1 and 2.

Figure 6:
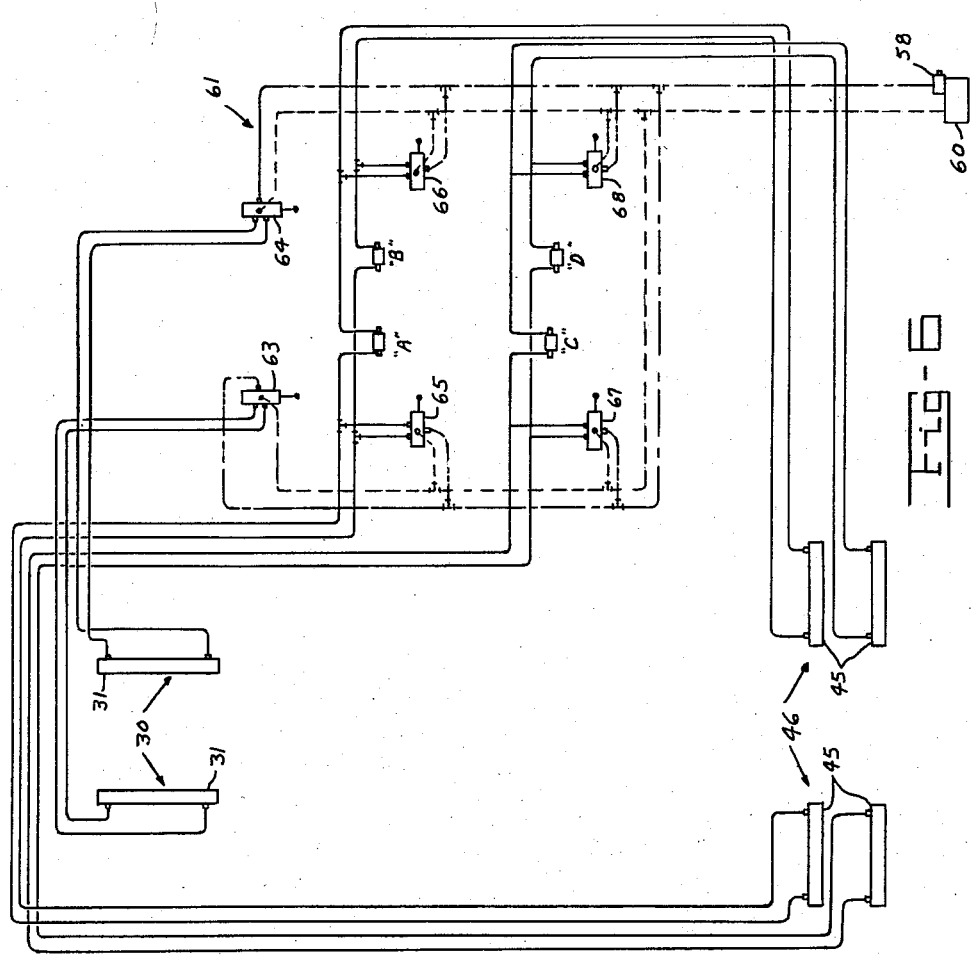
Fig. 6 is a schematic hydraulic system diagram illustrating the association of the various control valves employed for the selective directional control of the tire bead breaking press assembly.

Fig. 6 diagrammatically illustrates the hydraulic system of the tire bead breaking press assembly according to the present invention, wherein the hydraulic jacks 30 may be simultaneously or separately operated from independently operated control valves 63, 64 for raising or lowering the elevators 29 to the desired position.

The left and right upper cylinders 45 of the breaking plungers 46 are operated separately from independent directional control valves 65, 66 with shut-off valves A and B in closed position, or they may be operated together from either directional control valve 65 or 66 with the shut-off valves A and B in the open position.

In a similar manner, the left and right lower cylinders 45 of the aligning plungers 46 may be operated separately from independent directional control valves 67, 68 with shut-off valves C and D in closed position, or they may be operated simultaneously from either directional control valve 67 or 68 with the shut-off valves C and D in the open position.

The present invention has been described in detail above for purposes of illustration only and is not intended to be limited by this description or otherwise except as defined in the appended claims.

I claim:

1. A tire bead breaking press comprising elevator means including horizontally mounted hydraulic plungers for lateral projection on opposite sides of a wheel having a rim on which the beads of a tire casing are seated, actuating means for vertically adjusting said elevator means for accommodating tires of different diametrical sizes, breaking means on said plungers adapted to selectively engage the opposite side walls of the tire casing and push the beads free of the wheel rim, and control means for simultaneously or independently operating said hydraulic plungers.

2. A tire bead breaking press comprising elevator means including hydraulic plungers mounted thereon for lateral projection on opposite sides of a wheel having a rim on which the beads of a tire casing are seated, actuating means for vertically adjusting said elevator means for accommodating tires of different diametrical sizes, aligning means on certain of said plungers adapted to engage the opposite sides of the wheel, breaking means on the other of said plungers adapted to selectively engage the opposite side walls of the tire casing and push the beads free of the rim, and control means for simultaneously or independently operating said hydraulic plungers.

3. In a tire bead breaking press, a pair of upright frames mounted in horizontally spaced relation, each of said frames comprising an elevator frame slidably mounted for vertical movement thereon, and elevator actuating means for vertically adjusting said elevator frame for accommodating tires of various diametrical sizes, each of said elevator frames having a pair of hydraulic plungers horizontally mounted and in vertical spaced relation, one of said pair of plungers of each elevator frame having aligning means for positioning between said upright frames a wheel having a rim on which the beads of a tire casing are seated, the other of said pair of plungers of each elevator frame having breaking means adapted to selectively engage the adjacent side wall of the tire casing and push the bead free of the rim.

4. A tire bead breaking press comprising an upright frame assembly having a pair of frame sections mounted in horizontally spaced relation, an elevator frame slidably mounted on each of said frame sections for vertical movement, a hydraulic jack vertically mounted on each of said frame sections and connected to said elevator frame, said hydraulic jacks adapted to vertically adjust said elevator frames for accommodating tires of various diametrical sizes, hydraulic plungers mounted horizontally and in vertically spaced relation on each of said pair of frame sections, control means for selectively actuating said horizontally mounted plungers, an aligning element on each lower of said horizontally mounted plungers, said aligning elements adapted to engage the adjacent sides of a wheel positioned between said frame sections, and a breaking element on each upper of said horizontally mounted plungers, said breaking elements adapted to engage the adjacent sides of the tire casing and push the bead of the tire casing inwardly of the rim of the tire wheel.

5. A tire bead breaking press comprising an upright frame assembly, a pair of elevator means slidably mounted on said frame assembly in horizontally spaced relation with respect to each other, elevator actuating means vertically adjusting said elevator means for accommodating a wheel and tire casing assembly of different diametrical sizes positioned in a vertical plane, said elevator means having aligning means including a plate element in a vertical plane for projection laterally toward the opposite sides of the wheel for supporting the same and breaking means including an arcuate plate element in a horizontal plane for projection laterally to engage the tire casing side wall and push the bead of the tire casing toward the center of the rim of the wheel, and power means for selectively actuating said aligning and said breaking means.

References Cited in the file of this patent

UNITED STATES PATENTS

| 2,423,652 | Kelley | July 8, 1947 |
| 2,470,534 | Thomas | May 17, 1949 |
| 2,562,995 | Watkins | Aug. 7, 1951 |
| 2,753,924 | Pearne | July 10, 1956 |

FOREIGN PATENTS

| 732,595 | Great Britain | June 29, 1955 |